Figure 1:
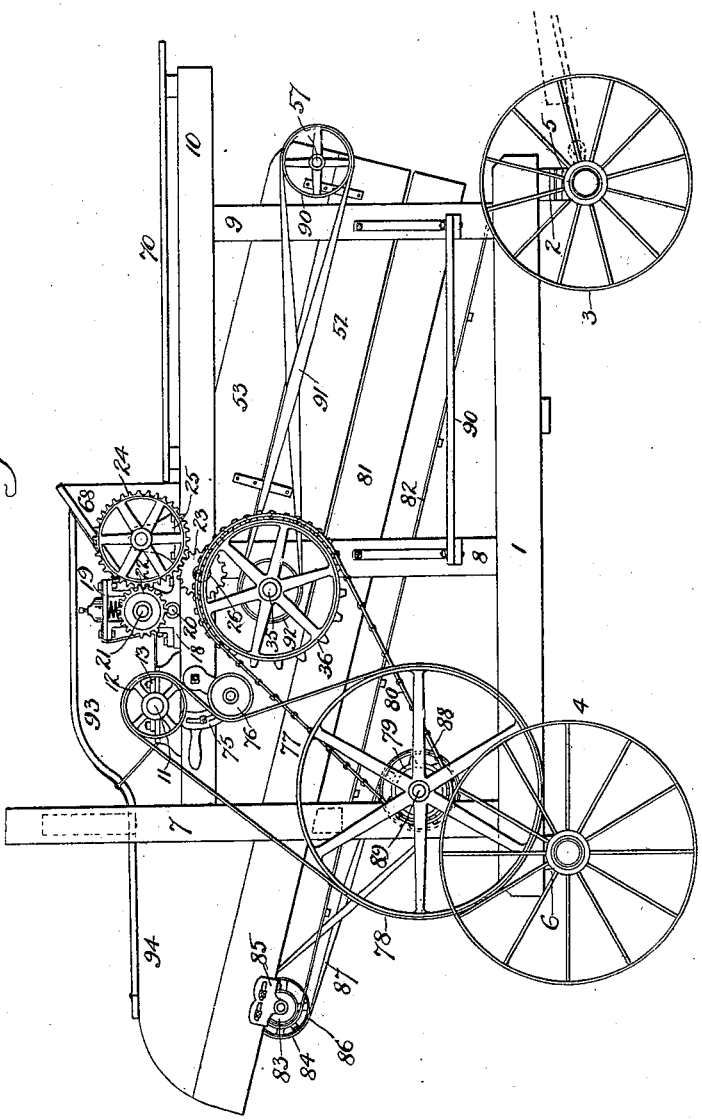

No. 644,344. Patented Feb. 27, 1900.
A. VAN NESS.
CORN HUSKING AND FODDER PREPARING MACHINE.
(Application filed Sept. 3, 1896. Renewed May 1, 1899.)
(No Model.) 4 Sheets—Sheet 1.

Witnesses
Wm. F. Henning
R. A. White.

Inventor
Albert Van Ness

No. 644,344. Patented Feb. 27, 1900.
A. VAN NESS.
CORN HUSKING AND FODDER PREPARING MACHINE.
(Application filed Sept. 3, 1896. Renewed May 1, 1899.)

(No Model.) 4 Sheets—Sheet 2.

Fig. 2.

Witnesses
Wm F. Henning
R. A. White

Inventor
Albert Van Ness

No. 644,344. Patented Feb. 27, 1900.
A. VAN NESS.
CORN HUSKING AND FODDER PREPARING MACHINE.
(Application filed Sept. 3, 1896. Renewed May 1, 1899.)
(No Model.) 4 Sheets—Sheet 3.
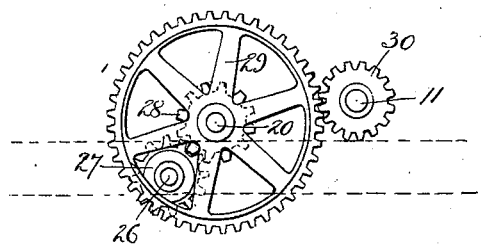
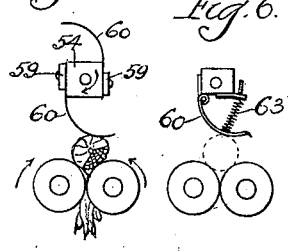
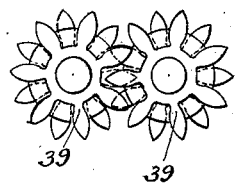
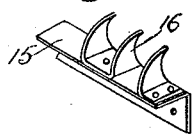
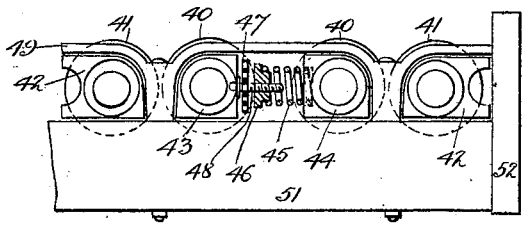
Witnesses
Inventor No. 644,344. Patented Feb. 27, 1900.
A. VAN NESS.
CORN HUSKING AND FODDER PREPARING MACHINE.
(Application filed Sept. 3, 1896. Renewed May 1, 1899.)
(No Model.) 4 Sheets—Sheet 4.

WITNESSES:
J. B. Longman.
C. E. Bruce.

INVENTOR
Albert Van Ness,
BY
David H. Fletcher,
ATTORNEY.

UNITED STATES PATENT OFFICE.

ALBERT VAN NESS, OF CHICAGO, ILLINOIS.

CORN-HUSKING AND FODDER-PREPARING MACHINE.

SPECIFICATION forming part of Letters Patent No. 644,344, dated February 27, 1900.

Application filed September 3, 1896. Renewed May 1, 1899. Serial No. 715,192. (No model.)

*To all whom it may concern:*

Be it known that I, ALBERT VAN NESS, a citizen of the United States, residing at Chicago, in the county of Cook and State of Illinois, have invented certain new and useful Improvements in Corn-Husking and Fodder-Preparing Machines, of which the following is a full, clear, and exact description, reference being had to the accompanying drawings, forming a part of this specification, in which corresponding numerals of reference in the different figures indicate like parts.

My invention relates to corn-husking and shredding machines, or those machines which are intended to separate the ears from the stalks, prepare the latter for fodder, and at the same time husk the ears and separate them from the other parts. Heretofore great difficulty has been met at the very outset in this class of machines in feeding the stalks thereto. In order to successfully snap or separate the ears from the stalks and to feed the material rapidly and successfully to the machine, it has been found of the utmost importance that the feeding should not only be uniform, but that the stalks should be evenly and uniformly distributed throughout the length of the feeding or snapping rolls and that all tendency to bunch or accumulate an extra quantity in any one place should be avoided. In addition to the foregoing it is essential in that class of machines in which the ears are moved longitudinally upon the husking-rolls during the operation of husking that means should be provided for pressing each ear, whether large or small or long or short, against the husking-rolls independently of its fellows and in such a way as to cause the ears to rotate and at the same time permit them to move lengthwise of the rolls and be delivered therefrom evenly and without obstruction. The object of my invention is to overcome these difficulties; and to these ends my invention consists more particularly in the peculiar construction of the feeding-rolls and in the special construction and arrangement of the presser-fingers in combination with the husking-rolls, all of which is hereinafter more particularly described, and definitely pointed out in the claims.

Figure 10:
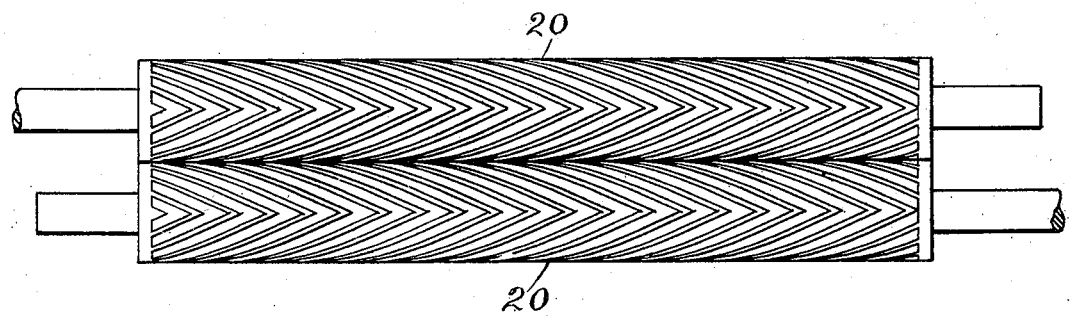

In the drawings, Figure 1 is an elevation of the left side of the machine. Fig. 2 is a central vertical sectional view showing the principal working parts of the machine. Fig. 3 is a detail view showing the gearing upon the right-hand side of the machine for transmitting power from the cylinder-shaft to the feeding-rollers. Fig. 4 is a side view of one of the feeding-rollers. Fig. 5 is an end view in detail of a pair of husking-rollers and the revoluble pressers as they would appear when operating upon an ear of corn. Fig. 6 is a detail view showing a modification of the parts shown in Fig. 5. Fig. 7 is a face view of a pair of gears for driving the husking-rollers. Fig. 8 is a detail of the shredding-teeth of the cylinder, showing the manner in which the same are attached to the cylinder-bar. Fig. 9 is an enlarged end view in detail of two pairs of husking-rollers, and Fig. 10 is a face view of a pair of feeding-rollers.

Referring to the drawings, 1 represents the framework of the machine, which is similar to that of machines of its class and is mounted upon wheels, as shown in Fig. 1. Suitable uprights 7, 8, and 9 are connected with horizontal bars 10 and inclined bars 8. The former serve as supports for a feeding-table 70. Supported in suitable bearings is the cylinder-shaft 11, upon which are mounted spiders 14, near its respective ends, which are connected by means of cross-bars 15, Figs. 2 and 8, of angle-iron, the latter serving as supports for the cylinder-teeth 16, which are preferably stamped from sheet metal and bolted or otherwise rigidly attached to the cross-bars.

Attached to the frame immediately in front of the cylinder are housings 18, in the lower portion of which is journaled the lower snapping-roller 20, while the upper snapping-roller 21 is supported in loose journal-boxes 32, which are held in place by means of the upright portions of the housings, whereby a vertical movement of the upper roller is permitted. Spiral springs 33 are interposed between the sliding journal-boxes and the top of the housings to press the upper rollers against the lower ones and to permit of an upward yielding of the upper rollers when stalks of corn are fed through them. Screws 34 serve to regulate the tension of the springs. A baffle-plate 17 is located between the lower snapping or feed roller and the cylinder, the upper portion of which plate serves to support the stalks as they pass from the snapping-rollers to the cylinder. The baffle-plate is placed obliquely and is provided with hollows and slanting surfaces, as shown, to act as deflectors. In the action of the machine the partially-shredded stalks are thrown into these hollows and are deflected back into the path of the teeth in a manner which serves more effectually to shred all portions of the stalks.

The husking-rollers 40 and 41 are placed with their axes at right angles to the axes of the feeding or snapping rollers described and are inclined from the plane of the horizon in substantially the same degree as are the side bars 81. Said husking-rollers are mounted in boxes 42, 43, and 44, which are supported upon the cross-bar 51 and are preferably arranged in two or more pairs, one roller of each pair being laterally movable to and from the other roller, the movable roller of one pair revolving in boxings 43 and that of the other pair in boxings 44. Springs 45 are placed between the boxings 43 and 44, each spring being provided with an adjusting-screw 48. The latter is pointed at its outer end, which rests in a notch in boxing 43 and is provided with a notched hand-wheel, by which it may be turned to regulate the tension of the springs through the nut 46. The husking-roller boxes are held in position upon the cross-bars 51 by means of the plates 49 and 50, Fig. 9.

Above each pair of husking-rollers and preferably parallel therewith, in a vertical plane midway between them, is located a revoluble shaft 54, to which is attached a number of independent yielding presser-fingers 60, the purpose and action of which is hereinafter more fully described. The shaft 54 is supported at its upper end by means of a hanger 61, which may be attached to a cross-piece 62 or to any suitable portion of the framework. The lower end of said shaft is journaled in a hanger-bearing 58, attached to a cross-shaft 57. The shafts are provided at their lower ends with beveled gears 55, which engage with like gears 56 upon the shaft 57, the latter being driven by means of the counter-shaft 35 and belt 91, connecting a pulley 92 on said counter-shaft with a pulley 90 on the shaft 57.

Beneath the cylinder and husking-rolls is located a conveyer-box 81, in which travels a conveyer 82, consisting of ordinary belting or link belts and slats trained over sprocket-wheels 83, mounted upon shafts 84 at the respective ends of the conveyer-box, the upper one only being shown.

The machine is driven, primarily, by means of a main counter-shaft 89, upon which is mounted a large pulley 77, the belt from which is trained over the cylinder-pulley 12. The various parts of the machine are driven by the cylinder-shaft, which may be actuated in any well-known way by any source of power. A pulley 12, mounted upon the cylinder-shaft, is connected with a large pulley 77 upon a counter-shaft 89 by means of a suitable belt 78, as shown in Fig. 1. An idler-pulley 76 and adjusting device 75 enable the tension of the belt to be regulated. The conveyer 82 is driven from the counter-shaft 89 by means of a pulley 86 on one of the conveyer-shafts 84, a pulley 88 on one of the counter-shafts 89, and a belt 87, connecting the two. The feeding and snapping rollers are actuated as follows: A gear 30 on the cylinder-shaft (see Fig. 3) engages with a gear 29 upon the lower feeding-roll, which drives the latter. Inside and adjacent to the gear 29, upon the same journal, is mounted a gear 28, which engages with a gear 27 upon the end of a counter-shaft 26, which shaft extends through the frame of the machine and has upon its opposite end (see Fig. 1) a gear 23. The journal of the upper snapping-roll is provided with a gear 22, which engages with an idler-gear 24, mounted upon a stud supported by a bracket 25, rigidly attached to the frame, which gear in turn engages with a gear 23 upon the counter-shaft 26. This system of gearing enables the feeding-rolls to be actuated in unison, while a considerable range of vertical movement of the upper roll is permitted without throwing the intermeshing gears out of the pitch-line.

The feeding-rollers are made with their surfaces ribbed diagonally, the ribs running in opposite directions throughout the length of the roll on different parts of the roller-surface, as shown in Figs. 4 and 10—that is to say, all of the ribs shown upon a given sectoral surface of the roll extending throughout its length are parallel to each other, but oblique to the axis of the roll, while those upon the adjacent sectoral surface meet them at a corresponding angle. In feeding the stalks of fodder between the snapping or feed rolls of machines of this class heretofore in use the rolls frequently become clogged by reason of the stalks being fed between the rolls in bunches with the ears tangled and bound between the stalks, in which event the bunches of stalks and ears cease to advance, but merely grind between the rolls for a considerable time before it is possible to work them loose and cause them to go on. By means of my improved rolls, however, having all of the obliquely-arranged ribs upon a given sectoral surface or longitudinal portion of the periphery of the roll extend throughout the length of said roll and all of the meeting ribs reversed in their direction with respect thereto, a lateral vibratory action is given to the bunch as the differently-directed ribs alternately engage therewith, which causes the stalks in the bunch to separate and become evenly distributed throughout the length of the rolls when the normal action of feeding or longitudinal movement of the stalks is resumed. As a result of this action the difficulty incident to feeding bunches of stalks is entirely overcome, as I have been enabled to fully demonstrate in a practical working machine, and I attribute the result not to the fact that I employ diagonally-arranged ribs upon the rolls, but to the fact that all of said ribs upon a given sectoral surface of a given roll are arranged to run in a given direction throughout the length of the roll, which action is aided by having all of the ribs upon the corresponding portion of the periphery of the coacting roll which acts positively and synchronously therewith arranged to coincide and conform in action with those upon the first roll, so that the tendency of the sets of coacting ribs upon the two rolls is to push all of the stalks laterally in one direction, while that of the next coacting set is to force them all in the opposite direction, thus imparting a continuous uniform lateral vibratory action to the stalks whenever they become or tend to become clogged.

I am aware that feeding-rolls have been devised having diagonally-arranged peripheral ribs; but their direction upon given peripheral surfaces has been reversed in different parts of the length of the roll, thereby causing adjacent stalks to move toward each other during a given portion of the revolution, which instead of preventing serves to aggravate and increase the very difficulty which I have aimed to overcome. It will be seen that there is no point upon my improved rolls throughout their length at which the stalks in their lateral movement can meet each other, but all are forced to move laterally in the same direction, and I do not wish to be understood as claiming any arrangement of diagonal ribs different from this.

Having described the construction and novel features of the feeding-rolls and the manner in which they are actuated with respect to each other, I will now describe the husking-rolls, the manner in which they are driven, and the novel elements which coact therewith, whereby improved results are attained.

The husking-rolls are driven by means of a counter-shaft 35, Fig. 1, mounted in appropriate bearings attached to the posts 8. Upon one end of the shaft 35 is placed a sprocket-wheel 36, which is connected by means of a link belt 80 to a sprocket-wheel 79 upon the main counter-shaft 89, by which power is transmitted to the shaft 35. Upon the journal of each husking-roller 41 (see Fig. 9) is mounted a beveled gear 38, Fig. 2, which engages with a driving beveled gear 37 upon the counter-shaft 35. Compound gears 39, meshing into each other, are mounted upon the journal of each roll, thereby imparting motion to the roller 40. The compound gears 39 are constructed in the usual manner of gears of that class—viz., with two sets of elongated teeth arranged in parallel planes and connected by means of an intervening web, as clearly shown in Fig. 7. These gears permit of a considerable lateral movement of the rolls without becoming disengaged, which play is obviously necessary where sticks and other unyielding substances are liable at any time to be fed into the rolls.

In order that the husks upon large and small ears may be readily grasped by the husking-rolls while the ears are passing longitudinally over them, it is essential that supplemental means should be provided for acting independently upon each ear irrespective of its size and pressing it against the rolls without impeding its longitudinal movement. This I accomplish by means of my improved presser-fingers 60 above referred to. Said presser-fingers may be made of thin and very flexible springs clamped to the shaft 54 by means of strips 59 or by any other suitable fastening device, or they may be made of stiff material hinged to the shaft 54 and provided with springs 63, arranged between the presser-finger and the shaft. (See Figs. 2, 5, and 6.) The disposition of the presser-fingers upon the shaft should be such as to cause an intermittent action thereof upon the ears of corn with respect to the different parts of the roll in order to permit the ears to slide longitudinally down the inclined husking-rolls without undue obstruction, while at the same time they may be pressed sufficiently against the rolls to insure the complete removal of the husks. This I accomplish, preferably, by arranging the presser-fingers in groups upon different peripheral parts of the head, but by preference in the manner shown in Fig. 2. In that case it will be seen that one group or part of the presser-fingers are clamped upon one side of the shaft, extending about half its length, while the other group is clamped upon the other side, diametrically opposite. The effect of this arrangement is to cause an intermittent action of the fingers upon the ears and to permit them to move longitudinally during the instant of time that the fingers are released therefrom during their revolution. Not only does each presser-finger act independently of its fellows, so that each ear, whether large or small, is acted upon during its passage, but the arrangement of the fingers in groups permits a freer longitudinal movement of the ears, which is highly essential. It is obvious that this arrangement of the presser-fingers may be varied even to the placing of each separate finger upon a different peripheral point on the shaft without departing from the principle involved; nor is any specific style of presser-finger essential, as by the term "presser-fingers" as employed in the claims I mean a series of separate devices, each one of which is adapted to act independently of its fellows to intermittently press the ears of corn against the rolls. Either one of the forms shown in Figs. 5 and 6 accomplishes this result without departing from the principle involved. Said fingers may be made with teeth upon their working faces or with a hook-shaped end, as shown in Fig. 6, for the purpose of loosening the husks. I am aware that flaps or flanges of rubber or similar yielding material have been used upon supplemental rolls in conjunction with husking-rolls, each supplemental roll containing a series of such flaps extending continuously throughout the length of the roll; but inasmuch as such a device is inconsistent with a longitudinal movement of the ears upon the husking-rolls and has only been used in machines in which each ear was presented laterally and independently to the husking-rolls such construction does not come within the province of my improvement, and I make no claim thereto.

The operation of said machine, in brief, is as follows: The cornstalks are fed from the table 70 to the feeding-rolls in the manner shown in Fig. 2. The feeding-rolls crush and draw the stalks into the feeding-cylinder, by which they are shredded and converted into fodder. Should the stalks cease to move forward and become clogged, the ribs upon the feeding-rolls cause them to vibrate laterally, as above described, and to become evenly distributed, and as soon as this occurs they are immediately carried forward again. When the ears of corn are brought into contact with the rolls, the stems are immediately snapped from the stalks and the ears fall lengthwise down the incline 66 to the husking-rolls, against which they are pressed by means of the revoluble fingers, as described, until they are delivered therefrom with all the husks removed.

Having thus described my invention, I claim—

1. In a fodder-preparing and husking machine, a pair of feeding-rolls each having peripheral ribs arranged obliquely to the axis of the roll, all of the ribs upon a given section of the periphery or sectoral surface of the roll being parallel to each other throughout its length, and all of the ribs in the adjacent sectoral surfaces throughout the length of the roll being oblique to or reversed with respect to the direction of the first-named ribs, whereby a uniform distributing action may be obtained upon the stalks as they are fed to the machine, substantially as described.

2. In a fodder-preparing and husking machine, the combination of a pair of feeding-rolls, each having peripheral ribs arranged obliquely to the axis of the roll, all of the ribs upon a given sectoral surface of the roll throughout its length being parallel to each other, and all of the ribs upon the adjacent sectoral surfaces throughout the length of the roll being arranged to meet said first-named ribs at an angle thereto, the coacting ribs upon the two rolls being arranged to coincide with each other when in action, and means for positively actuating said rolls in unison, substantially as described.

3. In a fodder-preparing and husking machine, the combination of a pair of feeding-rolls each having peripheral ribs arranged obliquely to the axis of the roll, all of the ribs upon a given sectoral surface of the roll throughout its length, being parallel to each other, and all of the ribs upon the adjacent sectoral surfaces throughout the length of the roll being arranged to meet said first-named ribs at an angle thereto, the coacting ribs upon the two rolls being arranged to coincide with each other when in action, means for positively actuating said rollers in unison, and means for permitting the axes of said rolls to yield or separate from each other, as and for the purposes set forth.

4. The combination in a machine of the class described, of inclined husking-rolls arranged parallel to each other, a revoluble shaft arranged above said rolls and in a plane midway between the two, and a series of independent elastic presser-fingers arranged at intervals throughout the length of said shaft, as distinguished from yielding longitudinal flaps, whereby the ears of corn may be permitted to move longitudinally upon the husking-rolls and be pressed against them in successive order by said fingers, substantially as described.

5. The combination in a machine of the class described, of inclined husking-rolls arranged parallel to each other, a revoluble shaft arranged above said rolls, and a series of independent yielding presser-fingers mounted upon said shaft in groups arranged longitudinally thereof, each group being attached to a different part of the periphery of said shaft, substantially as described.

ALBERT VAN NESS.

Witnesses:
H. C. BALLARD,
S. A. WHARTON.